US 11,103,834 B2

(12) United States Patent
Noda et al.

(10) Patent No.: US 11,103,834 B2
(45) Date of Patent: *Aug. 31, 2021

(54) DEHYDRATION METHOD AND DEHYDRATION APPARATUS

(71) Applicant: NGK INSULATORS, LTD., Nagoya (JP)

(72) Inventors: Kenichi Noda, Nagoya (JP); Makoto Miyahara, Nagoya (JP); Katsuya Shimizu, Nagoya (JP); Takeshi Hagio, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,946

(22) Filed: Dec. 3, 2019

(65) Prior Publication Data
US 2020/0101426 A1  Apr. 2, 2020

Related U.S. Application Data

(63) Continuation of application No. PCT/JP2018/021743, filed on Jun. 6, 2018.

(30) Foreign Application Priority Data

Jun. 7, 2017 (JP) .............................. JP2017-112633

(51) Int. Cl.
B01D 69/10 (2006.01)
B01D 71/02 (2006.01)
(Continued)

(52) U.S. Cl.
CPC ....... *B01D 71/028* (2013.01); *B01D 67/0088* (2013.01); *B01D 69/10* (2013.01);
(Continued)

(58) Field of Classification Search
CPC .... B01D 61/364; B01D 71/028; C01B 39/30; C01B 39/54; C02F 2209/03
See application file for complete search history.

(56) References Cited

U.S. PATENT DOCUMENTS 4,440,871 A * 4/1984 Lok ....................... C07C 5/2716
502/214
6,001,257 A  12/1999 Bratton et al.
(Continued)

FOREIGN PATENT DOCUMENTS

CN  104144738 A  11/2014
CN  106241830 A * 12/2016
(Continued)

OTHER PUBLICATIONS

Szostak, Rosemarie—Handbook of Molecular Sieves—Van Nostrand Reinhold, 1992 (Year: 1992).*
(Continued)

Primary Examiner — Bradley R Spies
(74) Attorney, Agent, or Firm — Burr & Brown, PLLC

(57) ABSTRACT

A dehydration method is a dehydration method for selectively separating water from a mixture that contains water, and the method includes a step of supplying the mixture to a supply side space of a zeolite membrane having an ERI structure, and a step of making a pressure difference between the supply side space and a permeation side space of the zeolite membrane having an ERI structure.

7 Claims, 5 Drawing Sheets

(51) Int. Cl.
*C02F 1/44* (2006.01)
*C02F 101/34* (2006.01)
*B01D 67/00* (2006.01)

(52) U.S. Cl.
CPC ............ *C02F 1/44* (2013.01); *C02F 2101/34* (2013.01); *C02F 2209/03* (2013.01)

(56) References Cited

U.S. PATENT DOCUMENTS

| | | | | |
|---|---|---|---|---|
| 6,387,269 | B1* | 5/2002 | Eltner | B01D 53/228 210/490 |
| 6,395,946 | B1 | 5/2002 | Van Giezen et al. | |
| 2009/0007780 | A1 | 1/2009 | Yajima et al. | |
| 2010/0311565 | A1* | 12/2010 | Liu | C01B 37/04 502/4 |
| 2014/0360939 | A1 | 12/2014 | Yamada et al. | |
| 2015/0361007 | A1 | 12/2015 | Millet et al. | |

FOREIGN PATENT DOCUMENTS

| | | |
|---|---|---|
| JP | H10-510466 A1 | 10/1998 |
| JP | 2002-503711 A1 | 2/2002 |
| JP | 2016-511235 A1 | 4/2016 |
| JP | 2016-215081 A1 | 12/2016 |
| JP | 2017-042724 A1 | 3/2017 |
| WO | 2007/119286 A1 | 10/2007 |

OTHER PUBLICATIONS

Li Shasha—CN-106241830—A Machine Translation—Dec. 2016 (Year: 2016).*
English translation of International Preliminary Report on Patentability (Application No. PCT/JP2018/021743) dated Dec. 19, 2019.
Tadafumi Yamamura, et al., "Development of Membrane Aided Reactor," *Mitsui Zosen Technical Review*, Feb. 2003, No. 178, pp. 115-120.
Ying Cui, et al., "Zeolite T Membrane: Preparation, Characterization, Pervaporation of Water/Organic Liquid Mixtures and Acid Stability," *Journal of Membrane Science*, 2004, No. 236, pp. 17-27.
International Search Report and Written Opinion (Application No. PCT/JP2018/021743) dated Sep. 4, 2018.
Chinese Office Action, Chinese Application No. 201880037277.8, dated May 27, 2021 (11 pages).

* cited by examiner

DEHYDRATION METHOD AND DEHYDRATION APPARATUS

TECHNICAL FIELD

The present invention relates to a dehydration method and a dehydration apparatus.

BACKGROUND ART

Organic membranes and inorganic membranes are conventionally used for separating water from (dehydrating) a mixture that contains water.

However, organic membranes are inferior in terms of heat resistance and chemical resistance, and therefore dehydration methods are proposed in which inorganic membranes, such as an A-type zeolite membrane (see Development of Membrane Aided Reactor, Mitsui Zosen Technical Review, February 2003, No. 178, 115-120, for example) and a T-type zeolite membrane (see Y. Cui et al., Zeolite T membrane: preparation, characterization, pervaporation of water/organic liquid mixtures and acid stability, Journal of Membrane Science, 2004, 236, 17-27, for example), are used as separation membranes.

SUMMARY

However, there is a risk that, in the dehydration method described in "Development of Membrane Aided Reactor", the A-type zeolite membrane will partially dissolve in water over a long period of use, and its dehydration performance will degrade. The T-type zeolite membrane described in "Zeolite T membrane: preparation, characterization, pervaporation of water/organic liquid mixtures and acid stability" has higher acid resistance when compared with A-type zeolite membranes, but this membrane also contains a zeolite having an OFF structure that includes pores larger than those of an ERI zeolite. Therefore, there is a risk that components that should not permeate will permeate through pores of the OFF structure, and furthermore, the membrane is unlikely to be dense and accordingly there is a risk that separation performance will not be sufficiently exhibited. Therefore, there are demands for a dehydration method that can suppress degradation of dehydration performance even for long periods of use.

The present invention was made in view of the above circumstances, and an object of the present invention is to provide a dehydration method and a dehydration apparatus that can suppress degradation of dehydration performance.

A dehydration method according to the present invention is a dehydration method for selectively separating water from a mixture that contains water, and the method includes a step of supplying the mixture to a supply side space of a zeolite membrane having an ERI structure, and a step of making a pressure difference between the supply side space and a permeation side space of the zeolite membrane having an ERI structure.

According to the present invention, a dehydration method and a dehydration apparatus that can suppress degradation of dehydration performance can be provided.

DESCRIPTION OF EMBODIMENTS

Dehydration Apparatus

The following describes, with reference to the drawings, one example of a dehydration apparatus that is used for carrying out a dehydration method for selectively separating water from a mixture containing water. In the present specification, "dehydration" means selectively separating water. "Selectively separating water" includes not only separating and taking out water of 100% purity from a mixture, but also separating and taking out a solution or gas that has a higher water content than that of the mixture.

Figure 1:
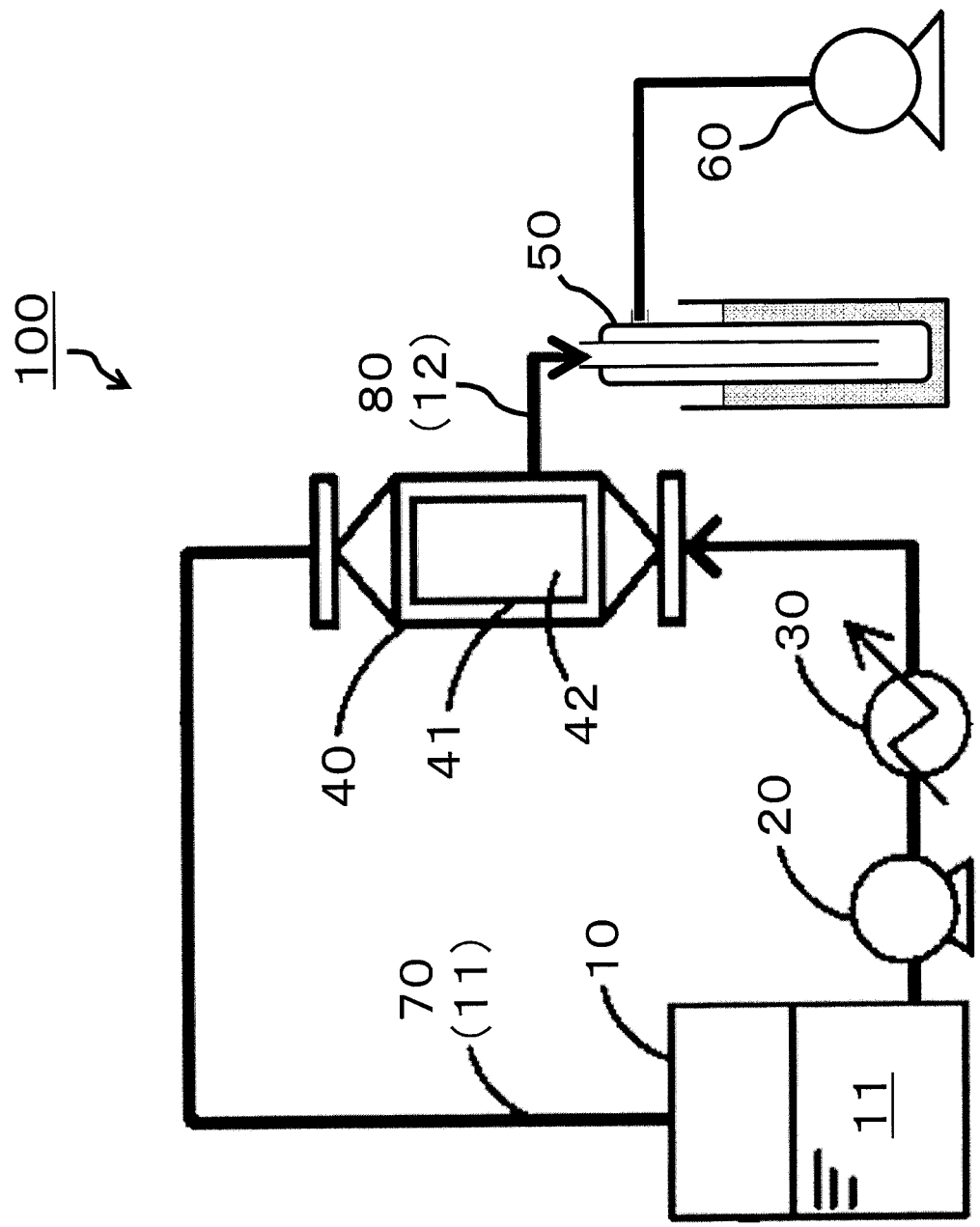
FIG. 1 is a schematic diagram showing the configuration of a dehydration apparatus.

FIG. 1 is a schematic diagram showing the entire configuration of a dehydration apparatus 100 according to the present embodiment.

The dehydration apparatus 100 includes an accommodation portion 10, a circulation pump 20, a heater 30, a separation vessel 40, a trapping portion 50, a pressure reducing apparatus 60, a circulation path 70, and a permeation path 80. The accommodation portion 10, the circulation pump 20, the heater 30, and the separation vessel 40 are arranged on the circulation path 70. The trapping portion 50 and the pressure reducing apparatus 60 are arranged on the permeation path 80.

The accommodation portion 10 accommodates a mixture 11 to be processed. The mixture 11 is circulated through the circulation path 70 to the accommodation portion 10. The mixture 11 contains water and components other than water.

The mixture 11 may contain water and organic compounds. Examples of organic compounds include alcohols, phenols, aldehydes, ketones, carboxylic acids, sulfonic acids, ethers, esters, amines, nitriles, straight-chain saturated hydrocarbons, branched saturated hydrocarbons, cyclic saturated hydrocarbons, chain unsaturated hydrocarbons, aromatic hydrocarbons, nitrogen-containing compounds, sulfur-containing compounds, and halogen derivatives of hydrocarbons. Examples of alcohols include methanol, ethanol, isopropanol, ethylene glycol, and butanol. Examples of ketones include acetone and ethyl methyl ketone. Examples of carboxylic acids include formic acid, acetic acid, butyric acid, propionic acid, oxalic acid, acrylic acid, and benzoic acid. Examples of aromatic hydrocarbons include toluene and benzene. The mixture 11 may contain only one component other than water or contain two or more components other than water.

The circulation pump 20 circulates the mixture 11 through the circulation path 70 by discharging the mixture 11 to the separation vessel 40 side. It is preferable that the supply fluid velocity of the mixture 11 supplied to the separation vessel 40 is 1.5 m/s or more and 3.0 m/s or less in cells 43, which will be described later. Alternatively, it is preferable that the Reynolds number caused by the supply fluid velocity of the mixture 11 supplied to the separation vessel 40 is 2000 or more and 10000 or less.

The heater 30 heats the mixture 11 circulated through the circulation path 70 to a temperature that is suitable for dehydration performed in the separation vessel 40. The temperature of the mixture 11 supplied to the separation vessel 40 is preferably from 50° C. to 130° C., and more preferably from 55° C. to 110° C., in order to efficiently perform a dehydration process.

The separation vessel 40 includes a housing portion 41 and a membrane structure 42. The housing portion 41 accommodates the membrane structure 42. The material of the housing portion 41 is not particularly limited, and can be determined as appropriate in accordance with characteristics of the mixture 11, for example. If the mixture 11 contains acid, for example, the housing portion 41 can be made of glass, stainless steel, or the like.

The interior space of the housing portion 41 is sectioned into a supply side space 4S and a permeation side space 4T by a zeolite membrane 45 having an ERI structure and included in the membrane structure 42, which will be described later (see FIG. 2). That is, the zeolite membrane 45 having an ERI structure and included in the membrane structure 42 separates the supply side space 4S and the permeation side space 4T from each other. The mixture 11 is supplied to the supply side space 4S. Out of the components of the mixture 11, a membrane-permeating substance 12 permeated through the zeolite membrane 45 having an ERI structure and included in the membrane structure 42 flows into the permeation side space 4T. The membrane-permeating substance 12 is water or a solution or gas in which water is concentrated. The configuration of the membrane structure 42 will be described later.

Note that pressure sensors (not shown) are connected to the separation vessel 40, and the pressure in the supply side space 4S and the pressure in the permeation side space 4T can be detected by the pressure sensors.

The trapping portion 50 is connected to the separation vessel 40 via the permeation path 80. When a dehydration process is carried out, the inside pressure of the trapping portion 50 can be reduced, and further, the pressure in the permeation side space 4T of the housing portion 41 can be reduced to a predetermined pressure, as a result of the pressure reducing apparatus 60 operating.

The trapping portion 50 is made of a material that can withstand pressure applied during a pressure reducing operation. The trapping portion 50 can be made of glass, stainless steel, or the like, for example.

A refrigerant may be used in the trapping portion 50 in order to cool and trap vapor of the membrane-permeating substance 12 flowing into the trapping portion 50. The refrigerant can be selected as appropriate depending on the type of the membrane-permeating substance 12 and the inside pressure of the trapping portion 50. Examples of refrigerants that can be used include liquid nitrogen, ice water, water, antifreeze liquid, dry ice (solid carbon dioxide), a combination of dry ice and ethanol (or acetone or methanol), and liquid argon.

However, the trapping portion 50 is not limited to the structure shown in FIG. 1, and is only required to be capable of trapping the membrane-permeating substance 12 while the pressure in the permeation side space 4T of the housing portion 41 is reduced to a predetermined pressure.

The pressure reducing apparatus 60 is one example of a "pressure changing apparatus" for making a pressure difference between the supply side space 4S and the permeation side space 4T. In the present embodiment, the pressure reducing apparatus 60 reduces the pressure in the permeation side space 4T to a predetermined pressure or a lower pressure. "Reducing the pressure" includes reducing partial pressure of the membrane-permeating substance 12 in the permeation side space 4T. A well-known vacuum pump can be used as the pressure reducing apparatus 60, for example.

Note that a pressure controller for adjusting the pressure in the permeation side space 4T may also be provided on the permeation path 80.

Membrane Structure

Figure 2:
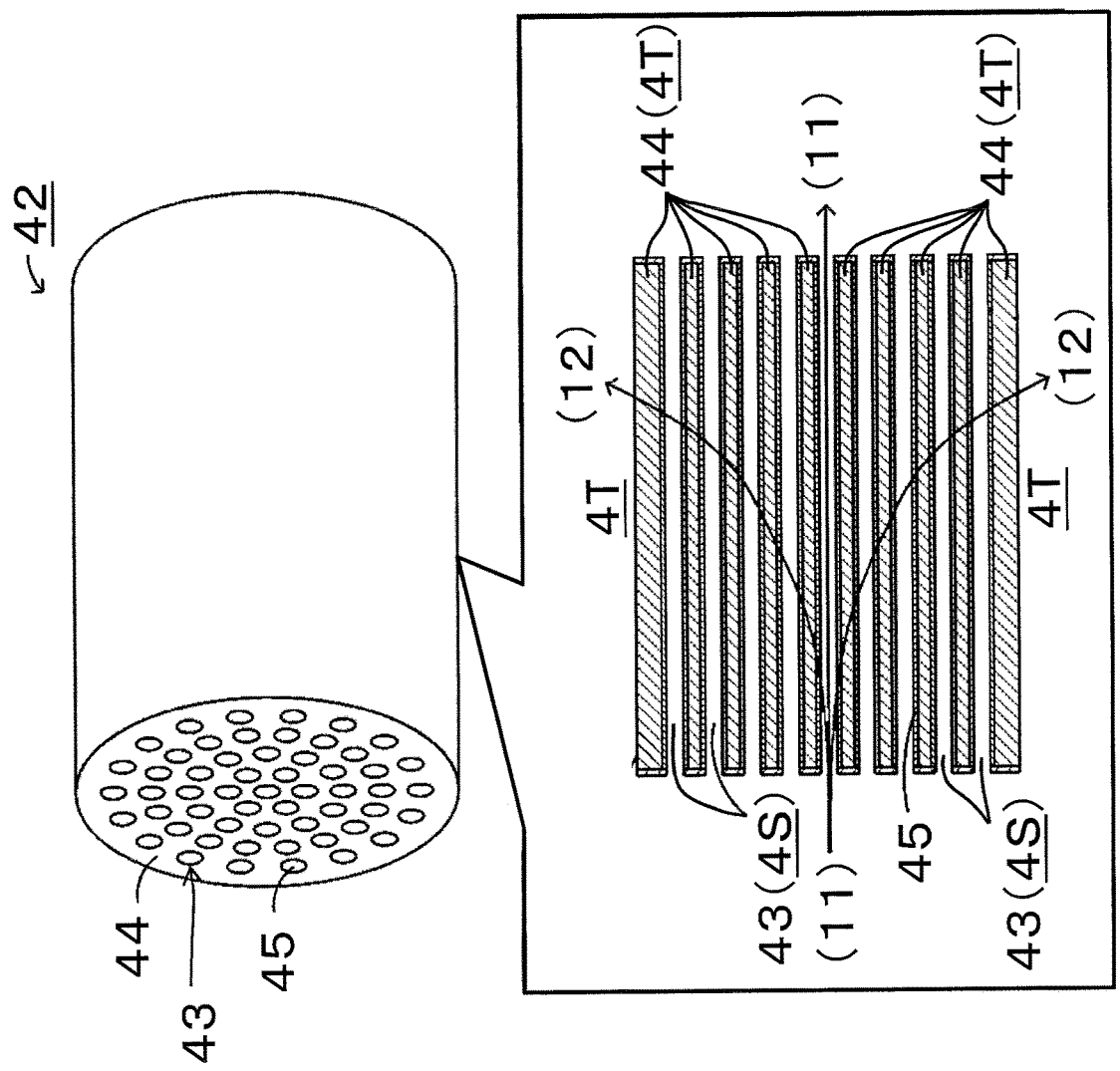
FIG. 2 is a cross-sectional view of a membrane structure.

FIG. 2 is a cross-sectional view of the membrane structure 42.

The membrane structure 42 includes a porous support 44 and the zeolite membrane 45 having an ERI structure. The zeolite membrane 45 having an ERI structure is constituted by zeolite crystals 46 having an ERI structure.

In the following description, the zeolite membrane 45 having an ERI structure is abbreviated as an "ERI membrane 45", and a zeolite crystal 46 having an ERI structure is abbreviated as an "ERI crystal 46".

1. Porous Support 44

The porous support 44 supports the ERI membrane 45. The porous support 44 has chemical stability to an extent that the ERI membrane 45 can be formed (crystallized, applied, or deposited) on a surface of the porous support 44 in the form of a membrane.

The porous support 44 is a ceramic sintered body. Alumina, silica, mullite, zirconia, titania, yttria, silicon nitride, silicon carbide, ceramic sand, cordierite, and the like can be used as the aggregate of the porous support 44. The porous support 44 may contain a binding material. A glass material containing silicon (Si), aluminum (Al), titanium (Ti), and the like can be used as the binding material. The content of the binding material may be set to be 20 vol % or more and 40 vol % or less, but is not limited thereto.

In the present embodiment, the porous support 44 has a monolith-shape. A monolith-shape refers to a shape having a plurality of cells 43 provided in the longitudinal direction, and includes a honeycomb shape. However, the porous support 44 is only required to have a shape with which the mixture 11 to be processed can be supplied to the ERI membrane 45. For example, the porous support 44 may have a flat plate-like shape, a tubular shape, a cylindrical shape, a columnar shape, or a prismatic column-like shape. Surface roughness (Ra) of the porous support 44 is preferably 0.1 µm to 2.0 µm, and more preferably 0.2 µm to 1.0 µm. Ra of the porous support 44 can be measured using a stylus surface roughness measurement device.

If the porous support 44 has a monolith-shape, the length thereof in the longitudinal direction can be set to 100 to 2000 mm, and the diameter thereof in the radial direction can be set to 5 to 300 mm, but there is no limitation thereon. If the porous support 44 has a monolith-shape, it is possible to form 30 to 2500 cells 43 having a diameter of 1 to 5 mm in the porous support 44. The distance between central axes of adjacent cells 43 can be set to 0.3 mm to 10 mm, for example. If the porous support 44 has a tubular shape, the thickness of the porous support 44 can be set to 0.1 mm to 10 mm, for example.

The porous support 44 is a porous body having multiple open pores. An average pore size of the porous support 44 need only be a size at which the membrane-permeating substance 12 (mainly water) in the fluid mixture that has permeated through the ERI membrane 45 can pass through pores. The permeation amount of the membrane-permeating substance 12 can be increased by increasing the average pore size of the porous support 44. The strength of the porous support 44 can be increased by reducing the average pore size of the porous support 44. The average pore size of the porous support 44 can be 0.01 µm or more and 5 µm or less, for example. The average pore size of the porous support 44 can be measured, depending on the size of pores, using a mercury intrusion method, an air-flow method described in ASTM F316, or perm porometry. The porosity of the porous support 44 is not particularly limited, and can be 25% to 50%, for example. With regard to a cumulative volume distribution of the pore size of the porous support 44, D5 can be 0.1 µm to 50 µm, for example, D50 can be 0.5 µm to 70 µm, for example, and D95 can be 10 µm to 2000 µm, for example.

An average particle size of the porous support 44 is not particularly limited, and can be 0.1 µm or more and 100 µm or less, for example. The average particle size of the porous support 44 refers to an arithmetic average value of the maximum diameters of 30 particles that are measured through cross-sectional observation using a SEM (Scanning Electron Microscope). 30 particles to be measured need only be selected in a SEM image at random.

The porous support 44 may have a monolayer structure in which pores have a uniform size, or a multilayer structure in which pores have different sizes. If the porous support 44 has a multilayer structure, it is preferable that the closer a layer is to the ERI membrane 45, the smaller the average pore size is. If the porous support 44 has a multilayer structure, the average pore size of the porous support 44 refers to an average pore size of an outermost layer that is in contact with the ERI membrane 45. If the porous support 44 has a multilayer structure, each layer can be constituted by at least one selected from the above-described materials, and materials constituting layers may be different from each other.

2. ERI Membrane 45

Figure 3:
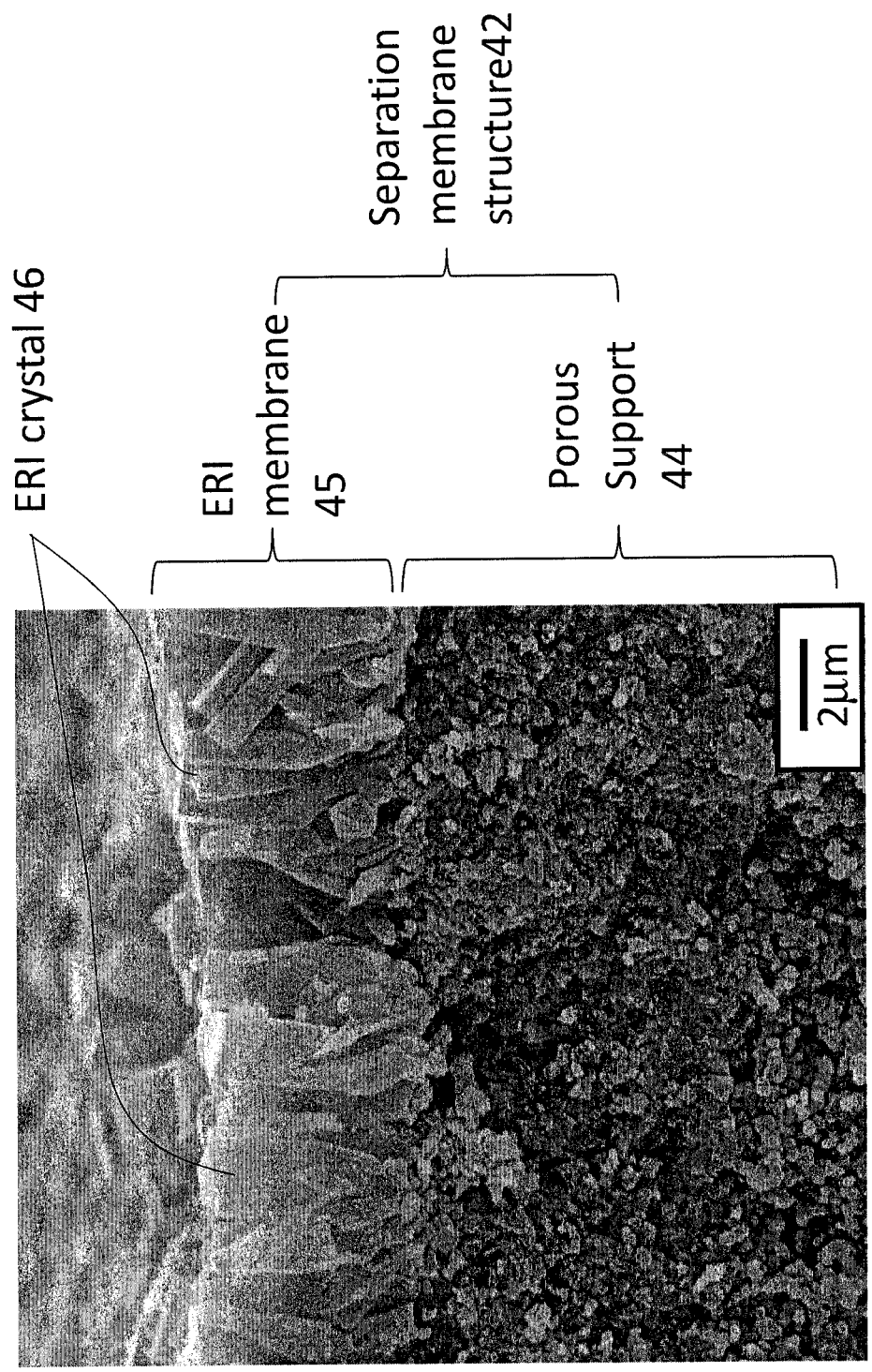
FIG. 3 is a SEM image showing a cross section of a porous support and an ERI membrane.
Figure 4:
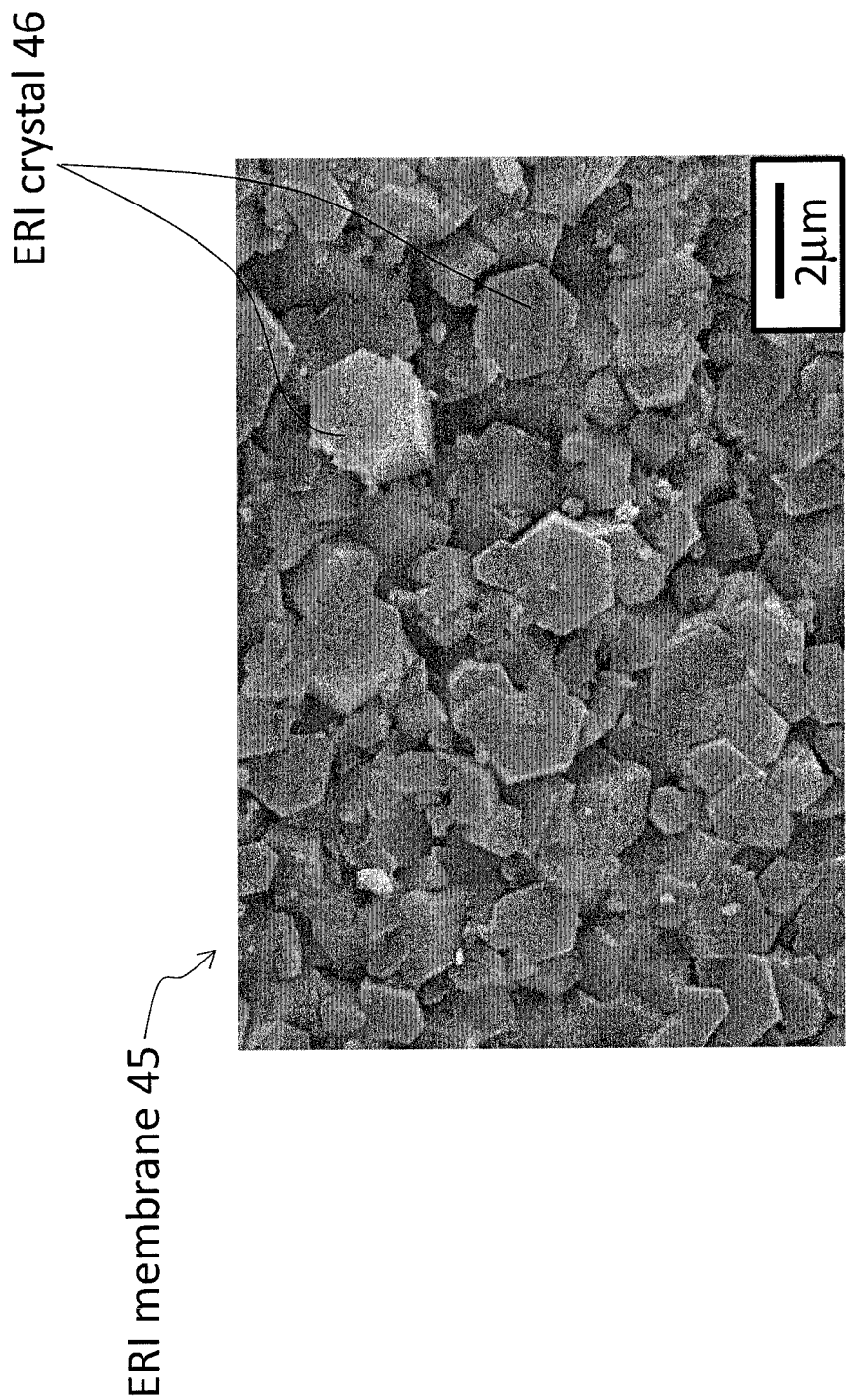
FIG. 4 is a SEM image showing a surface of an ERI membrane.

FIG. 3 is a SEM (scanning electron microscope) image showing a cross section of the ERI membrane 45. FIG. 4 is a SEM image showing a surface of the ERI membrane 45.

The ERI membrane 45 is formed on an inner surface of the porous support 44. The ERI membrane 45 is formed into a tubular shape. The space inside the ERI membrane 45 is the supply side space 4S and the space outside the ERI membrane 45 (i.e., the porous support 44 side space) is the permeation side space 4T. In the present embodiment, the supply side space 4S is a cell 43. The permeation side space 4T includes not only the exterior space of the porous support 44 but also the inside of the porous support 44.

Thus, one surface of the ERI membrane 45 faces the supply side space 4S and the other surface of the ERI membrane 45 faces the permeation side space 4T. When the mixture 11 is supplied to the supply side space 4S, the mixture 11 comes into contact with the one surface of the ERI membrane 45. When the pressure in the permeation side space 4T is reduced in this state, the membrane-permeating substance 12 contained in the mixture 11 permeates through the ERI membrane 45. The membrane-permeating substance 12 is water or a solution or gas in which water is concentrated. As described above, the membrane-permeating substance 12 permeated through the ERI membrane 45 is sucked by the pressure reducing apparatus 60 and is trapped in the trapping portion 50.

The thickness of the ERI membrane 45 is not particularly limited, and can be set to 0.1 µm or more and 10 µm or less. The ERI membrane 45 preferably has a thickness of 0.3 µm or more, and more preferably has a thickness of 0.5 µm or more, in consideration of sufficiently bonding crystals. The ERI membrane 45 preferably has a thickness of 5 µm or less, and more preferably has a thickness of 3 µm or less, in consideration of suppressing cracking caused by thermal expansion. Surface roughness (Ra) of the ERI membrane 45 is preferably 5 µm or less, and more preferably 2 µm or less. Ra of the ERI membrane 45 is measured by using a confocal laser microscope that can be used for three-dimensional measurement, obtaining values of Ra in 10 randomly selected fields of vision of 100 µm square by correcting waviness of the porous support 44, and taking the smallest value of the thus obtained values as the value of Ra.

The ERI membrane 45 is formed in the form of a membrane as a result of a plurality of ERI crystals 46 being linked to each other. Each ERI crystal 46 is a crystal constituted by a zeolite having an ERI structure. The ERI structure refers to a type of structure that meets the definition of an ERI type structure under the IUPAC structure codes as defined by the Structure Commission of the International Zeolite Association.

Examples of zeolites constituting ERI crystals 46 include a zeolite in which atoms (T atoms) located at centers of oxygen tetrahedrons ($TO_4$) constituting the zeolite are constituted by Si and Al, an AlPO zeolite in which T atoms are constituted by Al and P (phosphorus), an MAPO zeolite in which T atoms are constituted by magnesium (Mg), Al, and P, an SAPO zeolite in which T atoms are constituted by Si, Al, and P, and a ZnAPO zeolite in which T atoms are constituted by zinc (Zn), Al, and P. A portion of T atoms may be substituted by another element.

Each ERI crystal 46 internally has a plurality of oxygen 8-membered ring pores. An oxygen 8-membered ring pore refers to a pore constituted by an oxygen 8-membered ring. An oxygen 8-membered ring is also simply referred to as an "8-membered ring", and is a portion in which the number of oxygen atoms constituting the pore framework is eight, and oxygen atoms are linked to the above-described T atoms to form a ring structure.

Each ERI crystal 46 may contain a metal or metal ion for the purpose of providing absorptivity with respect to a specific component. Examples of such a metal or metal ion include one or more selected from the group consisting of alkali metals, alkaline earth metals, and transition metals. Although specific examples of transition metals include platinum (Pt), palladium (Pd), rhodium (Rh), silver (Ag), iron (Fe), copper (Cu), cobalt (Co), manganese (Mn), and indium (In), there is no limitation thereon.

Figure 5:
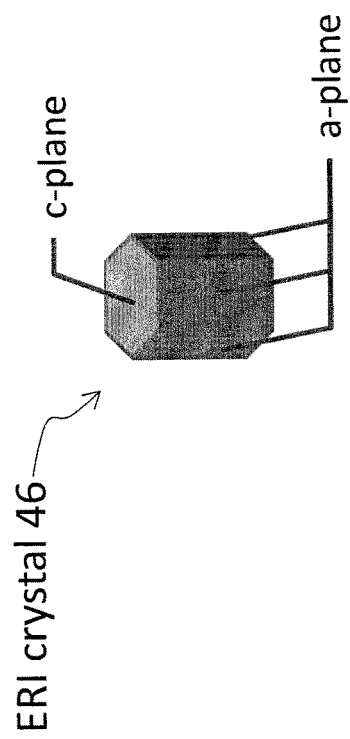
FIG. 5 is a schematic diagram showing the configuration of an ERI crystal.
Figure 6:
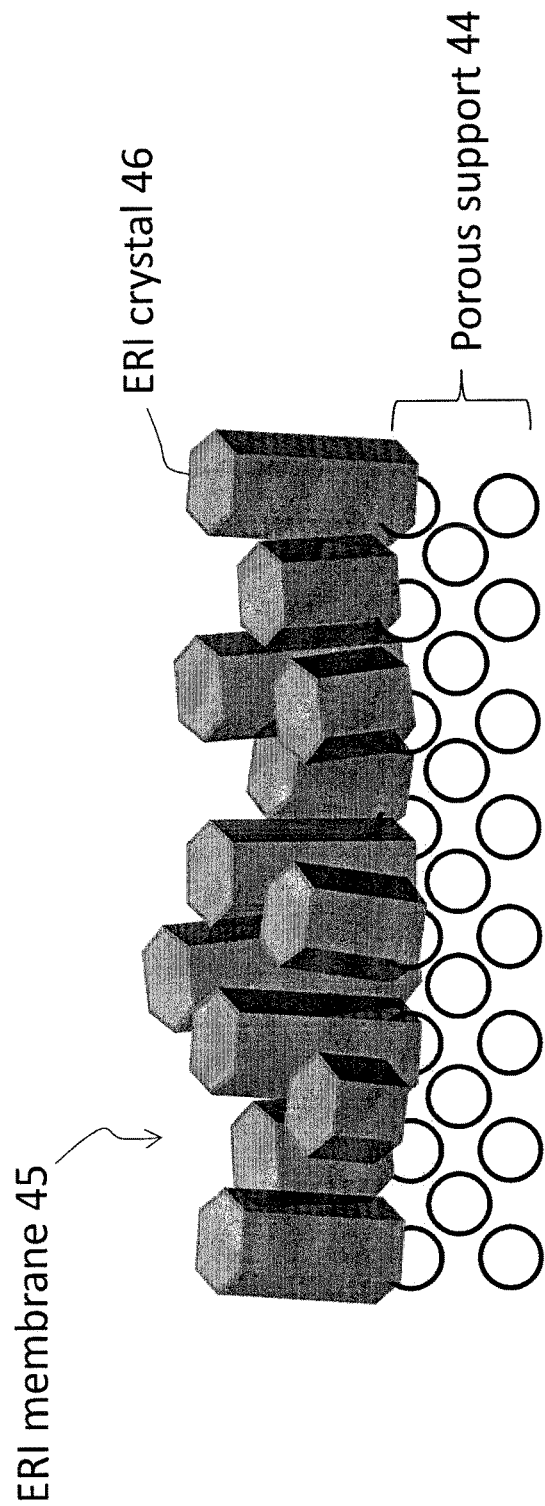
FIG. 6 is a schematic diagram showing a method for manufacturing an ERI membrane.

Here, FIG. 5 is a schematic diagram showing the configuration of an ERI crystal 46. As shown in FIG. 5, the ERI crystal 46 has a hexagonal column-like shape. It is preferable that the shape of a cross section of the ERI crystal 46 that is parallel to a c-plane is a regular hexagon, but there is no particular limitation thereon. If the cross section of the ERI crystal 46 has a hexagonal shape, it is possible to obtain a membrane that has high crystallinity and excellent durability, when compared with a case in which the cross section has an irregular shape, a circular shape, or an elliptical shape, for example.

A hexagonal c-plane ((001) plane) exists at an end face of the ERI crystal 46. Rectangular a-planes ({h00} planes) exist at side faces of the ERI crystal 46.

As shown in FIGS. 3 and 4, ERI crystals 46 stand on a surface of the porous support 44 and the orientation of the ERI crystals 46 is a c-plane orientation. Accordingly, mainly c-planes are exposed at the outer surface of the ERI membrane, and the ERI crystals 46 are joined to each other mainly at a-planes. With this configuration, bonding between the ERI crystals 46 can be increased, and therefore density of the membrane is increased, and separation performance can be sufficiently exhibited.

In an X-ray diffraction pattern obtained by irradiation of X-rays to the surface of the ERI membrane 45 using an X-ray diffraction (XRD) method, the peak intensity of a (002) plane (c-plane) is 0.5 times or more the peak intensity of a (100) plane (a-plane). This indicates that the c-plane orientation of the ERI crystals 46 is high. Accordingly, separation performance of the ERI membrane 45 can be improved to an extent that allows for its practical use by setting the peak intensity of the (002) plane to 0.5 times or more the peak intensity of the (100) plane.

In the X-ray diffraction pattern, the peak intensity of the (002) plane is preferably 0.9 times or more the peak intensity of the (100) plane, and more preferably 1.0 times or more the peak intensity of the (100) plane. In this case, separation performance of the ERI membrane 45 can be further improved.

The peak intensity refers to a value obtained by subtracting a background value from a measured value. An X-ray diffraction pattern can be obtained by irradiation of CuKα-rays to the membrane surface of the ERI membrane 45 using an X-ray diffraction apparatus (manufactured by Rigaku Corporation, model Miniflex600). Irradiation conditions are set as follows: the X-ray output is 600 W (tube voltage: 40 kV, tube current: 15 mA), the scan speed is 0.5 degrees/min, the scan step is 0.02 degrees, and an Ni foil having a thickness of 0.015 mm is used as a CuKβ-ray filter. A peak of the (002) plane is observed around 2 θ=12 degrees, and a peak of the (100) plane is observed around 2 θ=8 degrees.

Method for Manufacturing Membrane Structure 42

1. Production of Porous Support 44

A compact is formed by molding a ceramic material into a desired shape using an extrusion molding method, a press molding method, a cast molding method, or the like.

Then, the porous support 44 is formed by firing (900° C. to 1450° C., for example) the compact. The porous support 44 may have an average pore size of 0.01 μm or more and 5 μm or less.

In production of a porous support 44 that has a multilayer structure, a slurry that contains a ceramic material is applied to a surface of a fired compact through filtration or the like, and thereafter the compact is fired.

2. Production of Seed Crystals

A starting material solution is prepared by dissolving and dispersing T-atom sources, such as a silicon source, an aluminum source, and a phosphorus source, and a structure-directing agent (SDA) in pure water. It is preferable that at least two of Si, Al, and P are contained as T atoms, and it is more preferable that at least Al, P, and O are contained, in terms of improving the crystallinity of ERI crystals. Colloidal silica, fumed silica, tetraethoxysilane, sodium silicate, or the like can be used as a silicon source, for example. Aluminum isopropoxide, aluminum hydroxide, sodium aluminate, alumina sol, or the like can be used as an aluminum source, for example. Phosphoric acid, sodium dihydrogen phosphate, ammonium dihydrogen phosphate, or the like can be used as a phosphorus source, for example. N,N,N',N'-tetramethyldiaminohexane, cyclohexylamine, or the like can be used as a structure-directing agent, for example.

Next, the starting material solution is introduced into a pressure vessel, and hydrothermal synthesis (150° C. to 200° C., 10 to 60 hours) is performed to synthesize ERI crystals.

Then, ERI seed crystals (seed crystals having an ERI structure) are prepared by adjusting the size of the ERI crystals to an extent that portions of the ERI crystals are locked to openings of pores formed in the surface of the porous support 44. If an average particle size of the synthesized ERI crystals is 0.3 times or larger and is smaller than 5 times an average pore size of an applied surface of the porous support, these ERI crystals can be directly used as ERI seed crystals (seed crystals having an ERI structure) as a result of dispersing the ERI crystals. If the average particle size of the synthesized ERI crystals is larger than 0.3 times the average pore size of the applied surface of the porous support, ERI seed crystals may be produced by introducing the ERI crystals into pure water, and deflocculating and crushing the ERI crystals using a ball mill or the like so that the average particle size thereof falls within the above-described range. In crushing, the size of ERI seed crystals can be adjusted by changing the crushing time. The shape of the ERI seed crystals is not particularly limited, and may be a hexagonal column-like shape, a hexagonal plate-like shape, a cylindrical shape, a circular plate-like shape, an irregular shape, or the like, but an isotropic shape is more preferable. The average particle size of the ERI seed crystals is preferably 0.3 to 5 times the average pore size of the applied surface of the porous support, and is more preferably 0.5 to 3 times the average pore size thereof.

3. Formation of ERI Membrane 45

A seed crystal dispersion solution is prepared by dispersing the ERI seed crystals in water, an alcohol such as ethanol or isopropanol, or a solvent obtained by mixing water and an alcohol.

Then, as a result of filtering the seed crystal dispersion solution onto the surface of the porous support 44, the ERI seed crystals are attached to the surface of the porous support 44. At this time, the ERI seed crystals are locked to openings of pores formed in the surface of the porous support 44, and the ERI seed crystals are arranged on the surface of the porous support 44.

Then, a starting material solution is prepared by dissolving and dispersing T-atom sources, such as a silicon source, an aluminum source, and a phosphorus source, and a structure-directing agent (SDA) in pure water.

Then, the porous support 44 to which the ERI seed crystals are attached is immersed in the starting material solution, and hydrothermal synthesis (150° C. to 190° C., 10 to 60 hours) is performed. At this time, the ERI seed crystals arranged on the surface of the porous support 44 undergo crystal growth such that a-planes of the ERI structure are adjacent to each other, and therefore joining between standing ERI crystals 46 is facilitated and the ERI membrane 45 is formed as shown in FIG. 3.

Specifically, if the molar ratio $H_2O/T$ atom ($H_2O/T$ atom ratio) is 30 or higher and the molar ratio N atom in the SDA/T atom (N atom in the SDA/T atom ratio) is 0.7 to 1.5, it is possible to cause crystal growth of the ERI seed crystals such that a-planes of the ERI structure are joined to each other. If the molar ratio $H_2O/T$ atom is lower than 30, ERI crystals are generated in the starting material solution during synthesis of the membrane, and the seed crystals on the porous support may be unlikely to grow and it may be difficult to form the membrane. Furthermore, ERI crystals generated in the starting material solution attach to the surface of the porous support to which the seed crystals are applied, and the ERI crystals are not oriented to the c-plane, and therefore separation performance may be degraded. The $H_2O/T$ atom ratio is preferably 60 or higher, and more preferably 120 or higher. If the molar ratio N atom/T atom in the SDA is higher than 1.5, ERI crystals are generated in the starting material solution during synthesis of the membrane, and it may be difficult to form the membrane. If the molar ratio N atom in the SDA/T atom is lower than 0.7, ERI crystals are not oriented to the c-plane, and therefore separation performance may be degraded. The N atom in the SDA/T atom ratio is preferably 0.9 to 1.1.

Dehydration Method

A dehydration method according to the present invention is a method for selectively separating water from the mixture 11 containing water by making a pressure difference between opposite surfaces of the ERI membrane 45.

Specifically, the mixture 11 is supplied to the space 4S on the supply side of the ERI membrane 45 so that the mixture 11 comes into contact with one surface of the ERI membrane 45, and thereafter the pressure in the space 4T on the permeation side of the ERI membrane 45 is reduced, whereby water is selectively caused to permeate through the ERI membrane 45 and is separated.

In the dehydration method according to the present invention, the ERI membrane 45 that has high durability against water is used as the separation membrane, and therefore dehydration performance can be maintained over a long period of time.

Note that, if the mixture 11 is supplied in the form of a liquid, a pervaporation method can be used, and if the mixture 11 is supplied in the form of gas or supercritical gas, a vapor permeation method can be used.

If the pervaporation method is used, the pressure in the space 4S on the supply side of the ERI membrane 45 is not particularly limited, but is preferably atmospheric pressure. The pressure in the space 4T on the permeation side of the ERI membrane 45 is not particularly limited, but is preferably $8 \times 10^4$ Pa or less, more preferably $1 \times 10^{-2}$ to $5 \times 10^4$ Pa, and particularly preferably $1 \times 10^{-4}$ to $2 \times 10^4$ Pa. The temperature of the mixture 11 is not particularly limited, but is preferably 50° C. to 160° C., and more preferably 60° C. to 150° C. Thus, water can be separated from the mixture 11 at a low temperature, and therefore separation can be performed without using much energy. If the temperature of the mixture 11 is higher than 160° C., the energy cost may increase, and if the temperature is lower than 50° C., the separation speed may decrease.

If the vapor permeation method is used, the pressure in the space 4S on the supply side of the ERI membrane 45 is not particularly limited, but is preferably $1 \times 10^5$ to $2.5 \times 10^7$ Pa, and a higher pressure is more preferable from the standpoint of the separation speed. If the pressure difference between the supply side space 4S and the permeation side space 4T is $2.5 \times 10^7$ Pa or more, the ERI membrane 45 may be damaged or gas-tightness may be degraded. The pressure in the space 4T on the permeation side of the ERI membrane 45 is only required to be lower than the pressure in the supply side space 4S, but is preferably $8 \times 10^4$ Pa or less, more preferably $1 \times 10^{-2}$ to $5 \times 10^4$ Pa, and particularly preferably $1 \times 10^{-4}$ to $2 \times 10^4$ Pa. The temperature of the mixture 11 is not particularly limited, but is preferably 50° C. or higher, more preferably 100° C. to 400° C., and particularly preferably 100° C. to 200° C., in terms of energy cost. If the temperature of the mixture 11 is lower than 50° C., the separation speed may decrease. If the temperature of the mixture 11 is higher than 400° C., the membrane may be degraded.

The water permeation flux of the ERI membrane 45 at 50° C. is preferably 1 kg/(m²·h) or more, more preferably 1.5 kg/(m²·h) or more, and particularly preferably 2 kg/(m²·h) or more, in terms of improving dehydration performance. The water permeation flux can be determined by supplying pure water heated to 50° C. to the space 4S on the supply side of the ERI membrane 45, reducing the pressure in the space 4T on the permeation side of the ERI membrane 45 to 50 Torr, and collecting water vapor permeated through the ERI membrane 45.

Water selectivity of the ERI membrane 45 as determined using an aqueous ethanol solution at 50° C. is preferably 10 or higher, more preferably 20 or higher, and particularly preferably 50 or higher, in terms of improving water permeation selectivity in a dehydration operation. Water selectivity can be determined as a ratio (water concentration in permeating substance/ethanol concentration in permeating substance), in which "water concentration in permeating substance" is the concentration (mass %) of water and "ethanol concentration in permeating substance" is the concentration (mass %) of ethanol in a liquid that is obtained by supplying a 50 mass % aqueous ethanol solution heated to 50° C. to the space 4S on the supply side of the ERI membrane 45, reducing the pressure in the space 4T on the permeation side of the ERI membrane 45 to 50 Torr, and collecting the vapor permeated through the ERI membrane 45.

Other Embodiments

In the above-described embodiment, the structure of the separation vessel 40 is described with reference to FIGS. 1 and 2, but the separation vessel is not limited to this structure. The separation vessel 40 is only required to have a structure that includes the housing portion 41 and the membrane structure 42 (the ERI membrane 45 and the porous support 44), and is configured to be capable of carrying out the above-described dehydration method.

In the above-described embodiment, the dehydration apparatus 100 includes, as one example of a "pressure changing apparatus", the pressure reducing apparatus 60 that reduces the pressure in the permeation side space 4T, but the dehydration apparatus 100 may include a pressure increasing apparatus that increases the pressure in the supply side space 4S, instead of or in addition to the pressure reducing apparatus 60.

EXAMPLES

Examples of the present invention will be described below. However, the present invention is not limited to the examples described below.

Example 1

1. Production of Porous Support

A monolith-shaped compact having a plurality of through holes was formed with use of a green body containing an alumina raw material and an extrusion molding method, and then was fired.

Then, a porous layer including alumina as a main component was formed on surfaces of through holes of the fired compact, and the resulting compact was fired again to form a porous support. A surface of a portion of the porous support on which a membrane was to be formed had an average pore size of 65 to 110 nm.

2. Production of Seed Crystals

A starting material solution having a composition of 1 $Al_2O_3$:1.3 $P_2O_5$: 1.4 SDA: 130$H_2O$ was prepared by dissolving, in pure water, aluminum isopropoxide, 85% phosphoric acid, and N,N,N',N'-tetramethyldiaminohexane (TMHD), which is a structure-directing agent (SDA).

Then, the starting material solution was introduced into a pressure vessel, and hydrothermal synthesis (195° C., 30 hours) was performed.

Then, crystals obtained through hydrothermal synthesis were collected and sufficiently washed with pure water, and then were completely dried at 65° C.

Then, a crystal phase was checked through X-ray diffraction measurement, and it was confirmed that the obtained crystals were ERI crystals.

Then, ERI seed crystals were produced by introducing the synthesized ERI crystals into pure water in an amount of 10 to 20 mass % and crushing the ERI crystals using a ball mill for 7 days. External forms of the ERI seed crystals were checked using a SEM (scanning electron microscope), and it was found that the obtained ERI seed crystals had irregular forms, the particle size of the seed crystals was 0.01 to 0.3 μm, and the average particle size of the seed crystals was about 0.2 μm.

3. Formation of ERI Membrane

A seed crystal dispersion solution was prepared by dispersing the ERI seed crystals in ethanol.

Then, as a result of filtering the seed crystal dispersion solution through cells of the porous support, the ERI seed crystals were attached to inner surfaces of the cells of the porous support.

Then, a starting material solution having a composition of 1 $Al_2O_3$:2.1 $P_2O_5$:2.8 SDA:1340$H_2O$ was prepared by dissolving, in pure water, aluminum isopropoxide, 85% phosphoric acid, and TMHD, which is a structure-directing agent (SDA). In the starting material solution of Example 1, the molar ratio $H_2O$/T atom ($H_2O$/T atom ratio) was 220, and the molar ratio N atom in the SDA/T atom (N atom in the SDA/T atom ratio) was 0.9.

Then, the porous support to which the ERI seed crystals were attached was immersed in the starting material solution, and hydrothermal synthesis (160° C., 30 hours) was performed to synthesize an ERI membrane.

Then, the synthesized ERI membrane was sufficiently washed with pure water, and was completely dried at 90° C.

Then, SDA was burned off by heating the ERI membrane at 450° C. for 50 hours so that pores extended through the ERI membrane.

4. Separation Durability Test

A separation test was performed using the ERI membrane obtained as described above and a separation test apparatus shown in FIG. 1.

First, a 50 mass % aqueous ethanol solution heated to 50° C. was circulated using a circulation pump to supply the aqueous ethanol solution to a supply side space of a separation vessel.

Then, the pressure on the porous support side of the ERI membrane (permeation side space) was reduced to 50 Torr using a vacuum pump, while being controlled by a pressure controller, and vapor permeated through the ERI membrane was collected in a liquid nitrogen trap. The ethanol concentration in a liquid that was collected in the liquid nitrogen trap was taken as the "ethanol concentration before hot water treatment".

Then, the ERI membrane was removed from the separation test apparatus, was immersed in pure water in a pressure vessel, and hot water treatment (130° C., 50 hours) was performed.

Then, the ERI membrane was sufficiently washed with pure water, and was completely dried at 200° C.

The above-described separation test was performed again using the ERI membrane subjected to the hot water treatment. The ethanol concentration in the liquid that was collected in the liquid nitrogen trap was taken as the "ethanol concentration after hot water treatment".

As a result, it was found that the "ethanol concentration after hot water treatment" was not higher than 1.5 times the "ethanol concentration before hot water treatment".

Thus, it was found that the obtained ERI membrane had high stability against hot water and its dehydration performance was unlikely to degrade.

5. Microstructure Evaluation

In an X-ray diffraction pattern obtained by irradiation of X-rays to the membrane surface of the ERI membrane, the peak intensity of a (002) plane (c-plane) was 0.90 times the peak intensity of a (100) plane (a-plane). The outer surface of the ERI membrane and its cross section obtained by cutting the ERI membrane in its thickness direction were observed using a SEM, and it was confirmed that hexagonal column-shaped ERI crystals were oriented to the c-plane (see FIGS. 3 and 4).

Example 2

1. Production of Porous Support

A porous support was produced in the same process as that of Example 1.

2. Production of Seed Crystals

ERI seed crystals were produced in the same process as that of Example 1.

3. Formation of ERI Membrane

An ERI membrane was synthesized in the same process as that of Example 1, except that the composition of the starting material solution was changed to 1 $Al_2O_3$:2.0 $P_2O_5$:3.0 SDA:210$H_2O$, and hydrothermal synthesis was performed at 170° C. for 50 hours. In the starting material solution of Example 2, the $H_2O$/T atom ratio was 35, and the N atom in the SDA/T atom ratio was 1.0.

Then, the synthesized ERI membrane was sufficiently washed with pure water, and was completely dried at 90° C.

Then, SDA was burned off by heating the ERI membrane at 450° C. for 50 hours so that pores extended through the ERI membrane.

4. Separation Durability Test

A separation test was performed in the same manner as that of Example 1, using the ERI membrane obtained as described above. The ethanol concentration in the liquid that was collected in the liquid nitrogen trap was taken as the "ethanol concentration before hot water treatment".

Hot water treatment was performed in the same manner as that of Example 1, and the separation test was performed again. The ethanol concentration in the liquid that was collected in the liquid nitrogen trap was taken as the "ethanol concentration after hot water treatment".

As a result, it was found that the "ethanol concentration after hot water treatment" was not higher than 1.5 times the "ethanol concentration before hot water treatment".

Thus, it was found that the obtained ERI membrane had high stability against hot water and its dehydration performance was unlikely to degrade.

5. Microstructure Evaluation

In an X-ray diffraction pattern obtained by irradiation of X-rays to the membrane surface of the ERI membrane, the peak intensity of a (002) plane was 0.51 times the peak intensity of a (100) plane. The outer surface of the ERI membrane and its cross section obtained by cutting the ERI membrane in its thickness direction were observed using a SEM, and it was confirmed that hexagonal column-shaped ERI crystals were oriented to the c-plane.

Comparative Example 1

1. Production of Porous Support

A porous support was produced in the same process as that of Example 1.

2. Production of Seed Crystals

LTA seed crystals were produced by introducing crystals of a commercially available NaA type zeolite (zeolite having an LTA structure) into pure water in an amount of 10 to 20 mass %, and crushing the crystals using a ball mill for 6 hours. External forms of the LTA seed crystals were checked using a SEM (scanning electron microscope), and it was found that the obtained LTA seed crystals had irregular forms, the particle size of the seed crystals was 0.01 to 0.3 µm, and the average particle size of the seed crystals was about 0.2 µm.

3. Formation of LTA Membrane

A seed crystal dispersion solution was prepared by dispersing the LTA seed crystals in pure water.

Then, as a result of filtering the seed crystal dispersion solution through cells of the porous support, the LTA seed crystals were attached to inner surfaces of the cells of the porous support.

Then, a starting material solution having a composition of 1 $Al_2O_3$:4 $SiO_2$:40 $Na_2O$:1600$H_2O$ was prepared by dissolving, in pure water, aluminum sulfate, silica sol, and sodium hydroxide.

Then, the porous support to which the LTA seed crystals were attached was immersed in the starting material solution, and hydrothermal synthesis (100° C., 10 hours) was performed to synthesize an LTA membrane.

Then, the synthesized LTA membrane was sufficiently washed with pure water, and was completely dried at 90° C.

4. Separation Durability Test

A separation test was performed in the same manner as that of Example 1, using the LTA membrane obtained as described above. The ethanol concentration in the liquid that was collected in the liquid nitrogen trap was taken as the "ethanol concentration before hot water treatment".

Hot water treatment was performed in the same manner as that of Example 1, and the separation test was performed again. The ethanol concentration in the liquid that was collected in the liquid nitrogen trap was taken as the "ethanol concentration after hot water treatment".

As a result, it was found that the "ethanol concentration after hot water treatment" was approximately the same as that in the supplied aqueous ethanol solution, and was higher than 1.5 times the "ethanol concentration before hot water treatment".

5. Microstructure Evaluation

The outer surface of the LTA membrane was observed using a SEM, and it was confirmed that LTA dissolved and was lost through the hot water treatment.

Thus, it was found that the obtained LTA membrane had low stability against hot water and its dehydration performance was likely to degrade.

The invention claimed is:

1. A dehydration method for selectively separating water from a mixture that contains water, using a zeolite membrane consisting of an ERI structure, the method comprising:

a step of supplying the mixture to a supply side space of the zeolite membrane consisting of the ERI structure; and a step of making a pressure difference between the supply side space and a permeation side space of the zeolite membrane consisting of the ERI structure, wherein in an X-ray diffraction pattern of the zeolite membrane consisting of the ERI structure, a peak intensity of a (002) plane is at least 0.51 times or greater than a peak intensity of a (100) plane.

2. The dehydration method according to claim 1, wherein the zeolite membrane consisting of the ERI structure contains at least two elements out of Si, Al, and P.

3. The dehydration method according to claim 2, wherein the zeolite membrane consisting of the ERI structure contains at least Al, P, and O.

4. The dehydration method according to claim 1, wherein the zeolite membrane is formed on a porous support.

5. A dehydration apparatus comprising:

a separation vessel configured to include a porous support, a zeolite membrane consisting of an ERI structure that is formed on the porous support, and a housing portion that is sectioned into a supply side space of the zeolite membrane consisting of the ERI structure and a permeation side space of the zeolite membrane consisting of the ERI structure; and a pressure changing apparatus configured to increase a pressure in the supply side space and/or reduces a pressure in the permeation side space, wherein in an X-ray diffraction pattern of the zeolite membrane consisting of the ERI structure, a peak intensity of a (002) plane is at least 0.51 times or greater than a peak intensity of a (100) plane.

6. The dehydration apparatus according to claim 5, wherein the zeolite membrane consisting of the ERI structure contains at least two elements out of Si, Al, and P.

7. The dehydration apparatus according to claim 6, wherein the zeolite membrane consisting of the ERI structure contains at least Al, P, and O.

* * * * *